United States Patent
Takegoshi et al.

(10) Patent No.: US 6,803,965 B1
(45) Date of Patent: Oct. 12, 2004

(54) METHOD OF AND APPARATUS FOR MEASURING HORIZONTAL FREQUENCY

(75) Inventors: Hirotaka Takegoshi, Kanagawa (JP); Nobuo Yamazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/477,459

(22) Filed: Jan. 4, 2000

(30) Foreign Application Priority Data

Jan. 5, 1999 (JP) ............................................. 11-000445

(51) Int. Cl.$^7$ ................................................ H04N 5/04
(52) U.S. Cl. ...................................... 348/500; 348/542
(58) Field of Search ................................. 348/500, 543, 348/542, 554, 540, 555, 536, 558, 556; H04N 5/46, 3/27, 5/04

(56) References Cited

U.S. PATENT DOCUMENTS 5,212,552 A * 5/1993 Matsumoto
5,874,949 A * 2/1999 Furukawa

FOREIGN PATENT DOCUMENTS

JP 10-319930 * 12/1998

* cited by examiner

*Primary Examiner*—David E. Harvey
(74) *Attorney, Agent, or Firm*—Frommer Lawrence & Haug LLP; William S. Frommer (57) ABSTRACT

A method of measuring horizontal frequency, which comprises the steps of resetting an 8-bit counter, which counts horizontal synchronous pulses separated from a video signal, at a time point corresponding to an edge of a vertical synchronous signal separated from the video signal, causing a data latch portion, which is operative to latch count data obtained from a 16-bit counter operative to count clock pulses having a predetermined frequency, to latch the count data obtained from the 16-bit counter at a time point corresponding to an edge of a bit output signal obtained from the seventh bit position of the 8-bit counter, detecting a period which corresponds to 128 times a horizontal period of the video signal based on a difference between counted values represented respectively by a couple of count data latched successively by the data latch portion, and measuring horizontal frequency of the video signal by calculating the horizontal frequency on the strength of the period corresponding to 128 times the horizontal period.

13 Claims, 5 Drawing Sheets

METHOD OF AND APPARATUS FOR MEASURING HORIZONTAL FREQUENCY

BACKGROUND OF THE INVENTION

1. Field of the Invention

The present invention relates generally to method of and apparatus for measuring horizontal frequency, and more particularly, is directed to an improvement in method of and apparatus for measuring horizontal frequency of a video signal, which is supplied to, for example, an image display equipment operative to display images based on video signals, with making use of a horizontal synchronous signal contained in the video signal.

2. Description of the Prior Art

An image display equipment provided with an image displaying screen portion on which images based on video signals are displayed, may be supplied selectively with various kinds of video signals which are different from one another in horizontal frequency, a ratio of a video signal period to a horizontal period and so on. Accordingly, there has been proposed such an image display equipment as possessing a user preset function with which a user can set the apparatus to display on its image displaying screen portion images at a size of display appropriate to the video signal supplied to the equipment.

When the user preset function accompanying the image display equipment is actually exhibited for attaining its purpose, it is necessary to measure the horizontal frequency of the video signal supplied to the image display equipment. Therefore, the image display equipment which possesses the user preset function is also provided with an apparatus for measuring the horizontal frequency of the video signal supplied thereto.

Figure 1:
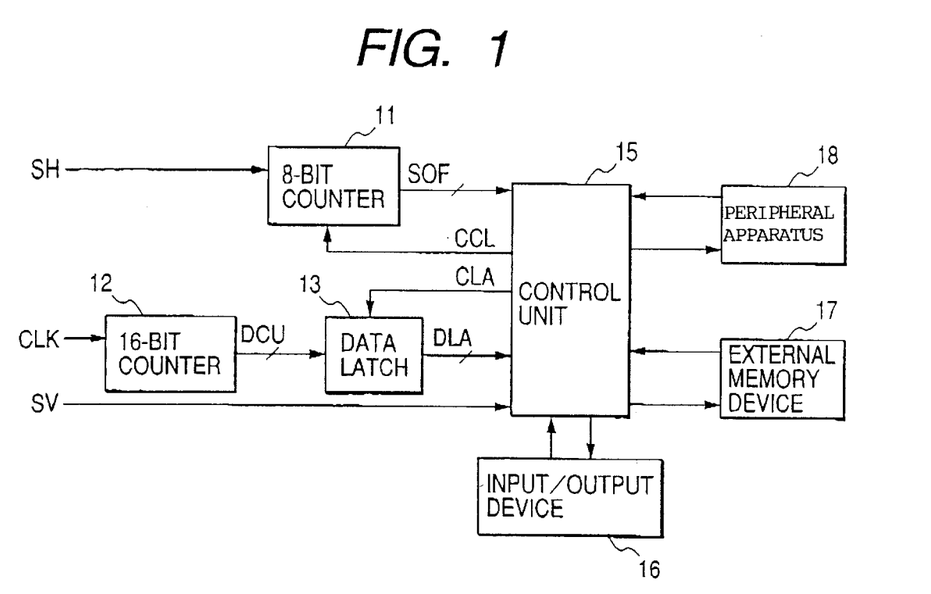
FIG. 1 is a schematic block diagram showing a previously proposed apparatus for measuring horizontal frequency of a video signal.

FIG. 1 shows a previously proposed apparatus for measuring the horizontal frequency of a video signal. The apparatus shown in FIG. 1 comprises an 8-bit counter 11 to which a horizontal synchronous signal SH separated from a video signal is supplied and which is operative to count horizontal synchronous pulses PH constituting the horizontal synchronous signal SH, a 16-bit counter 12 to which clock pulses CLK having a predetermined frequency are supplied to be counted, a data latch 13 for latching count date DCU obtained from the 16-bit counter 12 at a predetermined periodic timing, and a control unit 15 to which an overflow signal SOF obtained from the 8-bit counter 11, latch data DLA which are the count data DCU latched by the data latch 13 and a vertical synchronous signal SV separated from the video signal are supplied.

The control unit 15 is not provided only for constituting the apparatus for measuring the horizontal frequency of the video signal. Accordingly, an input/output device 16, an external memory device 17 and a peripheral apparatus 18, which are not related directly to the apparatus for measuring the horizontal frequency of the video signal, are connected with the control unit 15. The control unit 15 communicates with the input/output device 16, external memory device 17 and peripheral apparatus 18.

Figure 2A:
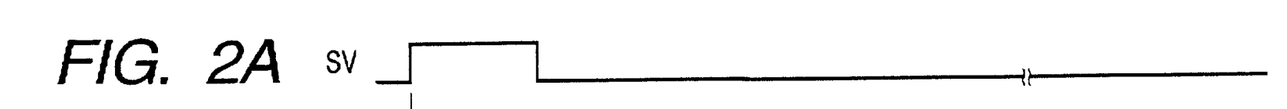
FIGS. 2A–2E are time charts used for explanation of the operation of the apparatus shown in FIG. 1.

The counting operation of the 16-bit counter 12 for counting the clock pulses CLK is reset whenever the count date DCU overflows so that the 16-bit counter 12 counts continuously the clock pulses CLK as far as the clock pulses CLK are supplied thereto. When the vertical synchronous signal SV as shown in FIG. 2A is supplied to the control unit 15, the control unit 15 supplies the 8-bit counter 11 with a clear control signal CCL to reset the counting operation of the 8-bit counter 11 and supplies also the date latch 13 with a latch control signal CLA to cause the date latch 13 to latch anew the count data DCU obtained on that occasion from the 16-bit counter 12 at a time point t1 at which a predetermined waiting time T0 has passed after a time point t0 corresponding to the front edge of the vertical synchronous signal SV. The waiting time T0 is selected to correspond to a period which contains equalizing pulses and notching pulses appearing in the horizontal synchronous signal SH after the time point t0 as shown in FIG. 2B.

Figure 2B:
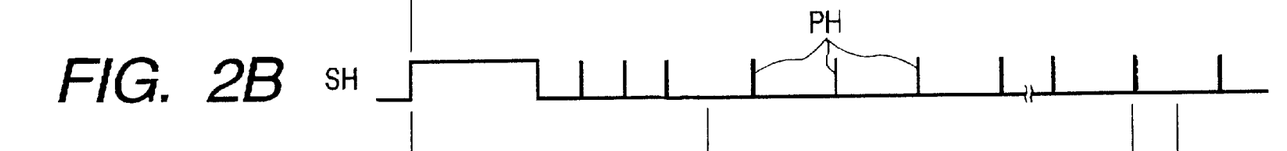
Figure 2C:
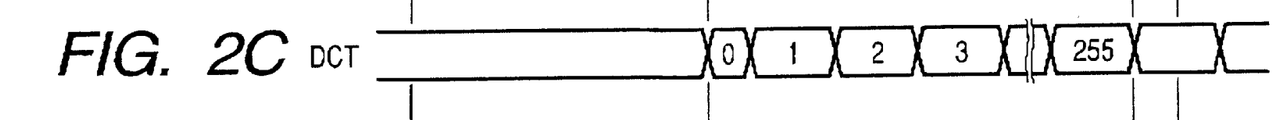

At the time point t1, the 8-bit counter 11 starts to count anew the horizontal synchronous pulses PH appearing in the horizontal synchronous signal SH after the time point t1 as shown in FIG. 2B to form count data DCT of the horizontal synchronous pulses PH as shown in FIG. 2C.

Figure 2D:
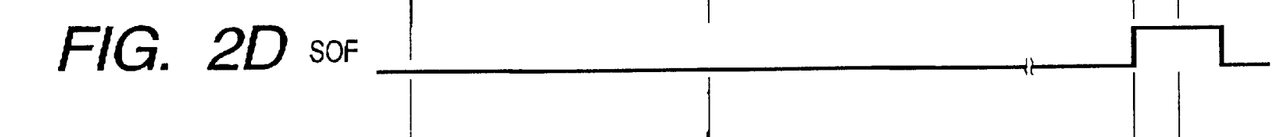
Figure 2E:
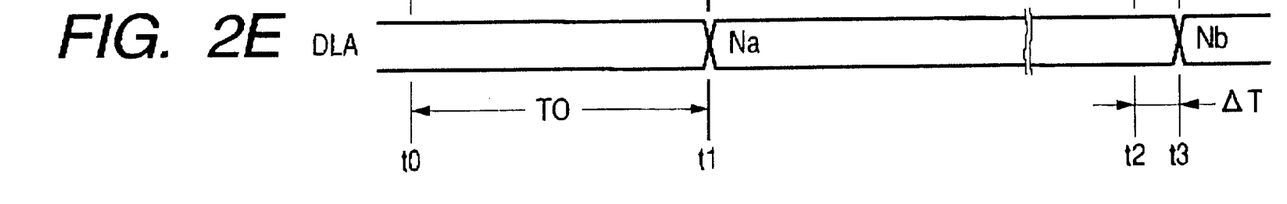

The data latch 13 latches the count data DCU obtained from the 16-bit counter 12 at the time point t1 and supplies the control unit 15 with the latch data DLA showing continuously a counted value Na represented by the count data DCU latched by the data latch 13 as shown in FIG. 2E. The control unit 15 to which the latch data DLA is supplied from the data latch 13 is operative to store the latch data DLA in a memory device contained therein.

After that, the 8-bit counter 11 produces the overflow signal SOF having its front edge at a time point t2 as shown in FIG. 2D to be supplied to the control unit 15 when the counted value represented by the count data DCT has exceeded "255".

The control unit 15 to which the overflow signal SFO is supplied from the 8-bit counter 11 supplies again the data latch 13 with the latch control signal CLA to cause the data latch 13 to latch anew the count data DCU obtained from the 16-bit counter 12 at a time point t3 at which a lag time ΔT resulting from a time required for data processing in the control unit 15 has passed after the time point t2. The data latch 13 latches the count data DCU obtained on that occasion from the 16-bit counter 12 at the time point t3 and supplies the control unit 15 with the latch data DLA showing continuously a counted value Nb represented by the count data DCU latched by the data latch 13 as shown in FIG. 2E. The control unit 15 to which the latch data DLA is supplied from the data latch 13 is operative to store the latch data DLA in the memory device contained therein.

After the latch data DLA showing continuously the counted value Nb are stored in the memory device contained in the control unit 15, the control unit 15 calculates the difference between the counted value Nb and the counted value Na which is shown by the latch data DLA stored previously in the memory device contained in the control unit 15, and detects a period corresponding to 256 times the horizontal period of the video signal. Then, the control unit 15 further calculates the horizontal frequency of the video signal by obtaining an inverse of $\frac{1}{256}$ the value representing the detected period corresponding to 256 times the horizontal period. In such a manner as described above, the horizontal frequency of the video signal is measured in the control unit 15.

As for the aforementioned image display equipment accompanied with the user preset function, it is desired for sure exhibition of the user preset function that the horizontal frequency of the video signal used in the equipment is precisely measured in such a manner that an error in measurement is restrained to be, for example, less than ±0.2 KHz. However, in the previously proposed apparatus for measuring the horizontal frequency of a video signal as described above, it cannot be expected to measure precisely the horizontal frequency of the video signal supplied to the apparatus.

In the case of the previously proposed apparatus mentioned above, the difference between the counted value Nb and the counted value Na calculated in the control unit 15 includes theoretically a first error of one count arising in the 16-bit counter 12 which counts the clock pulses CLK, a second error of one count at the maximum arising in the 8-bit counter 11 which results from the fact that the count data DCU obtained from the 16-bit counter 12 are latched by the data latch 13 at the time point t1 at which the waiting time T0 has passed after the time point t0 corresponding to the front edge of the vertical synchronous signal SV, and a third error which corresponds to the lag time ΔT from the time point t2 corresponding to the front edge of the overflow signal SOF obtained from the 8-bit counter 11 to the time point t3 at which the count data DCU obtained from the 16-bit counter 12 are latched by the data latch 13.

Although the first error can be reduced so as to be substantially negligible by causing the clock pulses CLK to have a relatively high frequency, it is quite difficult to avoid the second error with which the measured horizontal frequency may include an error of 256/255−1=0.4 percents at the maximum. Further, since the lag time ΔT results from the time required for data processing in the control unit 15, it is theoretically possible to reduce the third error by constituting the control unit 15 with a central processing unit which performs data processing at extremely high speed and giving the calculation of the horizontal frequency an especially high priority in operational interruption in the control unit 15. However, in practice, to employ the central processing unit which performs data processing at extremely high speed causes a cost to increase in a large scale and to give the calculation of the horizontal frequency the especially high priority in operational interruption in the control unit 15 puts heavy restrictions in operation on the control unit 15 to exert a bad influence upon, for example, the peripheral apparatus 18 connected with the control unit 15. Consequently, it is actually quite difficult to reduce the third error.

OBJECTS AND SUMMARY OF THE INVENTION

Accordingly, it is an object of the present invention to provide a method of measuring horizontal frequency of a video signal, which is supplied to, for example, an image display equipment operative to display images based on video signals, with making use of a horizontal synchronous signal contained in the video signal, which avoids the aforementioned difficulties encountered with the prior art.

Another object of the present invention is to provide a method of measuring horizontal frequency of a video signal, which is supplied to, for example, an image display equipment operative to display images based on video signals, with making use of a horizontal synchronous signal contained in the video signal, which can measure precisely the horizontal frequency of the video signal without requiring data processing necessary for the measurement to be performed at extremely high speed nor with especially high priority in operational interruption.

A further object of the present invention is to provide an apparatus for measuring horizontal frequency of a video signal, which is supplied to, for example, an image display equipment operative to display images based on video signals, with making use of a horizontal synchronous signal contained in the video signal, which avoids the aforementioned difficulties encountered with the prior art.

A still further object of the present invention is to provide an apparatus for measuring horizontal frequency of a video signal, which is supplied to, for example, an image display equipment operative to display images based on video signals, with making use of a horizontal synchronous signal contained in the video signal, which can measure precisely the horizontal frequency of the video signal without requiring data processing necessary for the measurement to be performed at extremely high speed nor with especially high priority in operational interruption.

According to an aspect of the present invention, there is provided a method of measuring horizontal frequency, which comprises the steps of resetting an N-bit counter (N is a positive integer, for example, 8),which is operative to count pulses constituting a horizontal synchronous signal separated from a video signal, at a time point corresponding to a front or rear edge of a vertical synchronous signal separated from the video signal, causing a data latch portion, which is operative to latch selectively count data obtained from an M-bit counter (M is a positive integer, for example, 16) operative to count clock pulses having a predetermined frequency, to latch the count data obtained from the M-bit counter at a time point corresponding to a front or rear edge of a bit output signal obtained from a predetermined bit position of the N-bit counter, detecting a period which corresponds to X times (X is a positive integer, for example, 128) a horizontal period of the video signal based on a difference between counted values represented respectively by a couple of count data latched successively by the data latch portion, and measuring horizontal frequency of the video signal by calculating the horizontal frequency on the strength of the period corresponding to X times the horizontal period of the video signal.

According to another aspect of the present invention, there is provided an apparatus for measuring horizontal frequency, which comprises an N-bit counter operative to count pulses constituting a horizontal synchronous signal separated from a video signal and subjected to resetting at a time point corresponding to a front or rear edge of a vertical synchronous signal separated from the video signal, an M-bit counter operative to count clock pulses having a predetermined frequency, a data latch portion operative to latch selectively count data obtained from the M-bit counter at a time point corresponding to a front or rear edge of a bit output signal obtained from a predetermined bit position of the N-bit counter, and an operation control portion for detecting a period which corresponds to X times a horizontal period of the video signal based on a difference between counted values represented respectively by a couple of count data latched successively by the data latch portion and measuring horizontal frequency of the video signal by calculating the horizontal frequency on the strength of the period corresponding to X times the horizontal period of the video signal.

In each of the method of and the apparatus for measuring horizontal frequency thus constituted in accordance with the present invention, the N-bit counter, which is, for example, an 8-bit counter and operative to count the pulses constituting the horizontal synchronous signal separated from the video signal, is subjected to reset at the time point corresponding to the front or rear edge of the vertical synchronous signal separated from the video signal, and the data latch portion is caused to latch the count data obtained from the M-bit counter, which is, for example, a 16-bit counter and is operative to count the clock pulses having the predetermined frequency at the time point corresponding to the front or rear edge of the bit output signal obtained from the predetermined bit position of the N-bit counter. Then, the period, which corresponds to X times which is, for example, 128 times the horizontal period of the video signal, is detected based on the difference between the counted values represented respectively by a couple of count data latched successively by the data latch portion and the horizontal frequency of the video signal is measured by calculating the horizontal frequency on the strength of the period corresponding to X times the horizontal period of the video signal.

With the reset to which the N-bit counter is subjected at the time point corresponding to the front or rear edge of the vertical synchronous signal separated from the video signal and the latch of the count data obtained from the M-bit counter carried out in the data latch portion at the time point corresponding to the front or rear edge of the bit output signal obtained from the predetermined bit position of the N-bit counter, the difference between the counted values represented respectively by a couple of count data latched successively by the data latch portion includes theoretically only an error of one count in the M-bit counter. This error of one count in the M-bit counter can be reduced so as to be negligible in practice by using clock pulses having a relatively high frequency as the clock pulses counted by the M-bit counter. As a result, the horizontal frequency of the video signal calculated based on the difference between the counted values represented respectively by a couple of count data latched successively by the data latch portion is accurately obtained in such a manner that the error of one count in the M-bit counter is effectively reduced.

Consequently, with each of the method of and the apparatus for measuring horizontal frequency according to the present invention, the horizontal frequency of the video signal can be surely measured with high precision without requiring data processing necessary for the measurement to be performed at extremely high speed nor with especially high priority in operational interruption.

The above and other objects, features and advantages of the present invention will become apparent from the following detailed description which is to be read in conjunction with the accompanying drawings.

DESCRIPTION OF THE PREFERRED EMBODIMENTS

Figure 3:
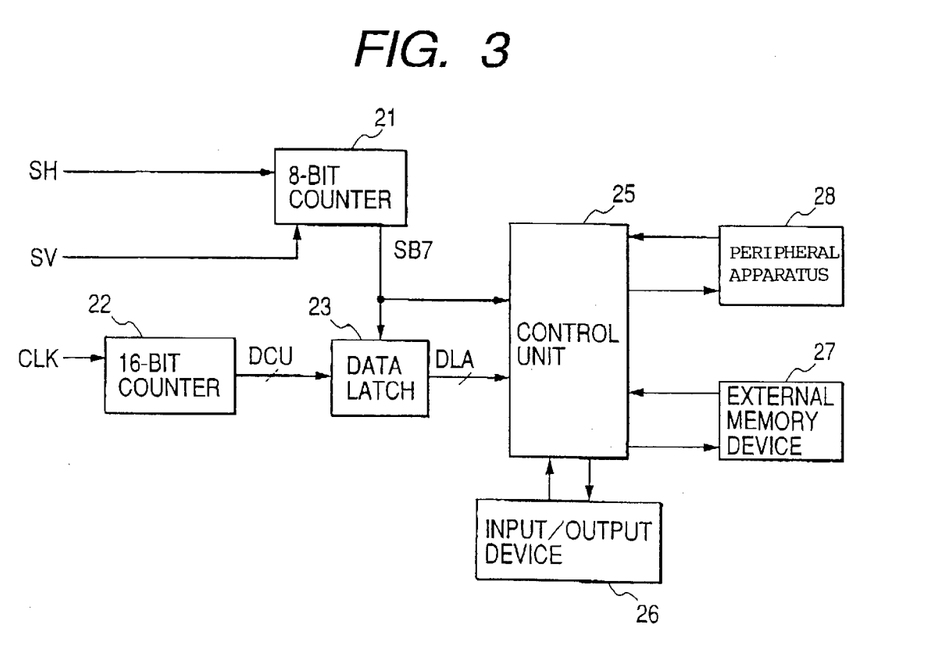
FIG. 3 is a schematic block diagram showing an embodiment of apparatus for measuring horizontal frequency according to the present invention in which an embodiment of method of measuring horizontal frequency according to the present invention is carried out.

FIG. 3 shows an embodiment of apparatus for measuring horizontal frequency according to the present invention in which an embodiment of method of measuring horizontal frequency according to the present invention is carried out.

Referring to FIG. 3, the embodiment of apparatus for horizontal frequency according to the present invention comprises an 8-bit counter 21 to which a vertical synchronous signal SV and a horizontal synchronous signal SH separated from a video signal are supplied and which is operative to count horizontal synchronous pulses constituting the horizontal synchronous signal SH and subjected to reset by the vertical synchronous signal SV, a 16-bit counter 22 to which clock pulses CLK having a predetermined frequency are supplied to be counted, a data latch 23 for latching count date DCU obtained from the 16-bit counter 22 at a predetermined time point corresponding to a bit output signal SB7 which is obtained from the seventh bit position of the 8-bit counter 21, and a control unit 25 to which the bit output signal SB7 obtained from the seventh bit position of the 8-bit counter 21 and latch data DLA which are the count date DCU latched by the data latch 23 are supplied.

The control unit 25 is not provided only for constituting the embodiment of apparatus for measuring horizontal frequency but provided for constituting the embodiment of apparatus for measuring horizontal frequency and for attaining other functions. Accordingly, an input/output device 26, an external memory device 27 and a peripheral apparatus 28, which are not related directly to the embodiment of apparatus for measuring horizontal frequency, are connected with the control unit 25. The control unit 25 communicates with the input/output device 26, external memory device 27 and peripheral apparatus 28. In the embodiment of apparatus for measuring horizontal frequency, the control unit 25 constitutes an operation control portion.

Figure 4A:
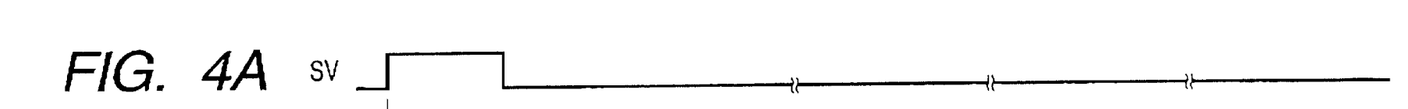
FIGS. 4A–4E are time charts used for explanation of the operation of the embodiment shown in FIG. 3.
Figure 4B:
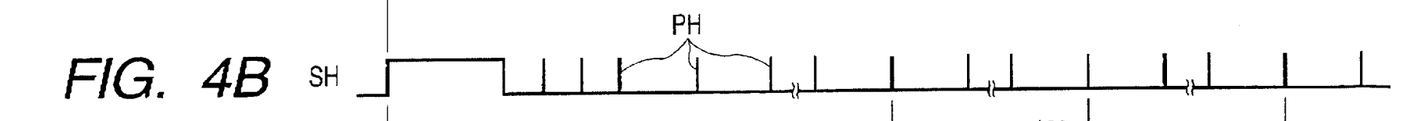

The counting operation of the 16-bit counter 22 for counting the clock pulses CLK is reset whenever the count date DCU overflows so that the 16-bit counter 22 counts continuously the clock pulses CLK as far as the clock pulses CLK are supplied thereto. When the vertical synchronous signal SV as shown in FIG. 4A is supplied to the 8-bit counter 21, the 8-bit counter 21 is subjected to reset in response to the vertical synchronous signal SV at a time point corresponding to a front or rear edge of the vertical synchronous signal SV, for example, a time point t5 corresponding to the front edge of the vertical synchronous signal SV. The 8-bit counter 21 starts to count anew the horizontal synchronous pulses PH constituting the horizontal synchronous signal SH as shown in FIG. 4B and produces count data DCT of the horizontal synchronous pulses PH as shown in FIG. 4C each time of reset at the time point t5.

Figure 4C:
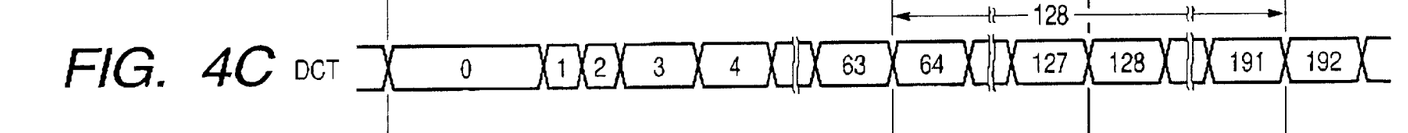
Figure 4D:
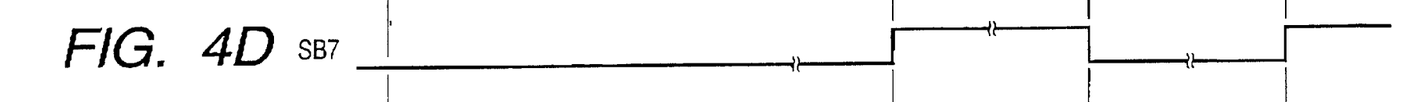

As shown in FIGS. 4C and 40, the bit output signal SB7 obtained from the seventh bit position of the 8-bit counter 21 rises to a high level from a low level to form a front edge at a time point t6 at which the count data DCT obtained from the 8-bit counter 21 comes to represent a counted value "64". The front edge of the bit output signal SB7 thus formed is transmitted to the data latch 23 and the control unit 25 constituting the operation control portion.

The front edge of the bit output signal SB7 transmitted to the data latch 23 causes the data latch 23 to latch anew the count data DCU obtained on that occasion from the 16-bit counter 22 at the time point t6.

Figure 4E:
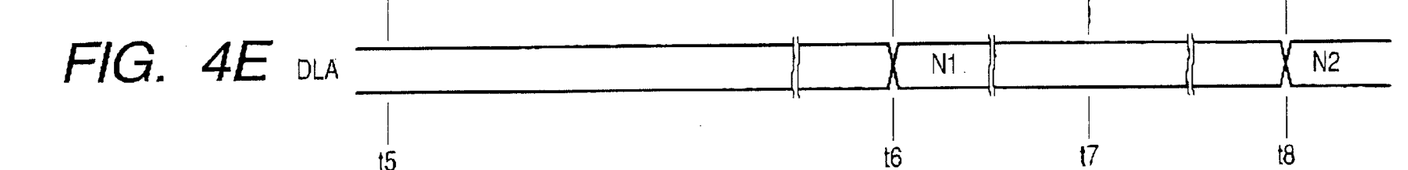

The data latch 23 latches the count data DCU obtained from the 16-bit counter 22 at the time point t6 and supplies the control unit 25 with the latch data DLA showing continuously a counted value N1 represented by the count data DCU latched by the data latch 23 as shown in FIG. 4E.

The front edge of the bit output signal SB7 transmitted to the control unit 25 causes the control unit 25 to store the latch data DLA obtained from the data latch 23 in a memory device contained therein.

As shown in FIGS. 4C and 4D, the bit output signal SB7, which has turned into the high level from the low level to form the front edge at the time point t6, maintains the high level up to a time point t7 at which the count data DCT obtained from the 8-bit counter 21 comes to represent a counted value "128" and falls to the low level from the high level to form a rear edge at the time point t7.

Then, as shown in FIGS. 4C and 4D, the bit output signal SB7 obtained from the seventh bit position of the 8-bit counter 21 rises again to the high level from the low level to form a new front edge at a time point t8 at which the count data DCT obtained from the 8-bit counter 21 comes to represent a counted value "192" after the 8-bit counter 21 has counted the horizontal synchronous pulses PH by 128. A time corresponding to 128 times the horizontal period of the video signal has passed during the period from the time point t6 at which the bit output signal SB7 rises to the high level from the law level to form the front edge to the time point t8 at which the bit output signal SB7 rises again to the high level from the law level to form the next front edge. The front edge of the bit output signal SB7 formed at the time point t8 is also transmitted to the data latch 23 and the control unit 25 constituting the operation control portion.

The front edge of the bit output signal SB7 transmitted to the data latch 23 causes the data latch 23 to latch anew the count data DCU obtained on that occasion from the 16-bit counter 22 at the time point t8. The data latch 23 latches again the count data DCU obtained from the 16-bit counter 22 at the time point t8 and supplies the control unit 25 with the latch data DLA showing continuously a counted value N2 represented by the count data DCU latched by the data latch 23 as shown in FIG. 4E. Further, the front edge of the bit output signal SB7 transmitted to the control unit 25 causes the control unit 25 to store the latch data DLA obtained from the data latch 23 in the memory device contained therein.

The control unit 25, which has stored the latch data DLA showing the counted value N1 from the data latch 23 in the memory device and then the latch data DLA showing the counted value N2 from the data latch 23 also in the memory device, calculates a difference between the counted value N2 and the counted value N2 which are shown respectively by a couple of the latch data DLA stored successively in the memory device, and detects a period corresponding to 256 times the horizontal period of the video signal based on the calculated difference. Then, the control unit 25 further calculates the horizontal frequency of the video signal by obtaining an inverse of $1/128$ the value representing the detected period corresponding to 128 times the horizontal period. In such a manner as described above, the horizontal frequency of the video signal is measured in the control unit 25.

In the embodiment shown in FIG. 3 and described above, by which the horizontal frequency of the video signal is measured, the 8-bit counter 21 is subjected to reset at the time point corresponding to the front edge of the vertical synchronous signal SV, and the data latch 23 is caused to latch the count data DCU obtained from the 16-bit counter 22 at the time point corresponding to the front edge of the bit output signal SB7 obtained from the seventh bit position of the 8-bit counter 21. Then, in the control unit 25, the period corresponding to 128 times the horizontal period of the video signal is detected based on the difference between the counted value N2 and the counted value N1 represented respectively by a couple of count data DCU latched successively by the data latch 23 and the horizontal frequency of the video signal is measured by calculating the horizontal frequency on the strength of the period corresponding to 128 times the horizontal period of the video signal.

With the reset to which the 8-bit counter 21 is subjected at the time point corresponding to the front edge of the vertical synchronous signal SV and the latch of the count data DCU obtained from the 16-bit counter 22 carried out in the data latch 23 at the time point corresponding to the front edge of the bit output signal SB7 obtained from the seventh bit position of the 8-bit counter 21, as mentioned above, the difference between the counted value N2 and the counted value N1 represented respectively by a couple of count data DCU latched successively by the data latch 128 includes theoretically only an error of one count in the 16-bit counter 22. This error of one count in the 16-bit counter 22 can be reduced so as to be negligible in practice by using clock pulses having a relatively high frequency as the clock pulses CLK counted by the 16-bit counter 22.

As a result, the horizontal frequency of the video signal calculated based on the difference between the counted value N2 and counted value N1 represented respectively by a couple of count data DCU latched successively by the data latch 23 is accurately obtained in such a manner that the error of one count in the 16-bit counter 22 is effectively reduced. Consequently, with the embodiment shown in FIG. 3, the horizontal frequency of the video signal can be surely measured with high precision without requiring data processing necessary for the measurement to be performed at extremely high speed nor with especially high priority in operational interruption.

Further, with the embodiment shown in FIG. 3, since the count data DCT obtained from the 8-bit counter 21 at the time point t8 represents the counted value "192", 192 horizontal periods of the video signal are used for measuring the horizontal frequency of the video signal, and therefore, the horizontal frequency of a video signal which has more than 192 horizontal periods in each vertical period (each field period), for example, 200 horizontal periods in each vertical period, can be surely measured.

Figure 5:
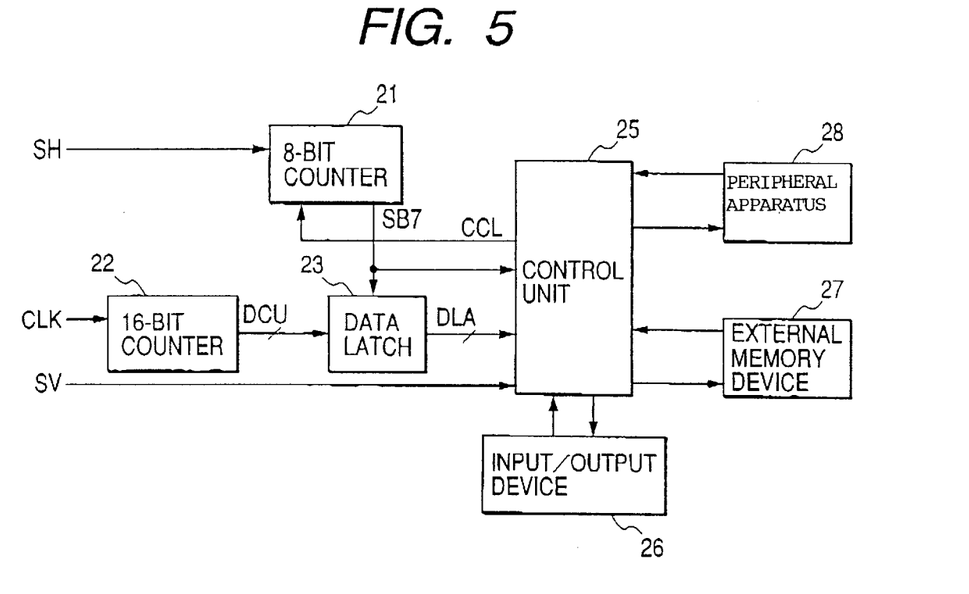
FIG. 5 is a schematic block diagram showing another embodiment of apparatus for measuring horizontal frequency according to the present invention in which another embodiment of method of measuring horizontal frequency according to the present invention is carried out.

FIG. 5 shows another embodiment of apparatus for measuring horizontal frequency according to the present invention in which another embodiment of method of measuring horizontal frequency according to the present invention is carried out.

The embodiment shown in FIG. 5 is constituted in almost the same manner as the embodiment shown in FIG. 3. In FIG. 5, the blocks and signals which corresponding to those in the embodiment shown in FIG. 3 are marked with the references used in common with the embodiment shown in FIG. 3 and a further explanation thereof will be omitted.

In the embodiment shown in FIG. 5, the vertical synchronous signal SV, which is supplied to the 8-bit counter 21 in the embodiment shown in FIG. 3, is supplied to the control unit 25 constituting the operation control portion. When the vertical synchronous signal SV is supplied to the control unit 25, the control unit 25 produces a clear control signal CCL in response to, for example, the front edge of the vertical synchronous signal SV and supplies the 8-bit counter 21 with the clear control signal CCL to reset the 8-bit counter 21.

The horizontal synchronous signal SH is also supplied to the 8-bit counter 21 and the 8-bit counter 21 starts to count anew the horizontal synchronous pulses PH constituting the horizontal synchronous signal SH and produces count data of the horizontal synchronous pulses PH each time of reset by the clear control signal CCL.

Figure 6:
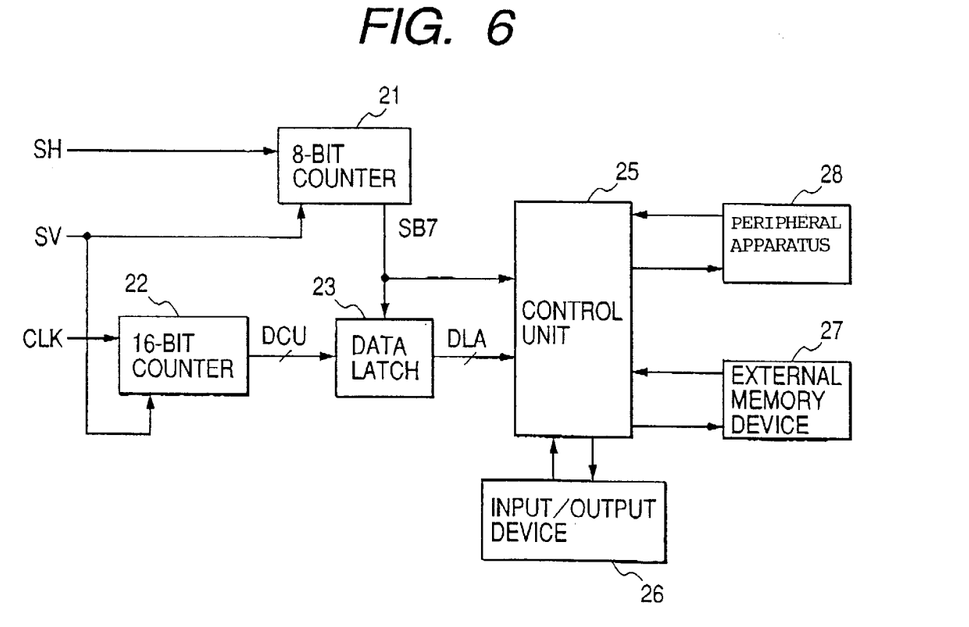
FIG. 6 is a schematic block diagram showing a further embodiment of apparatus for measuring horizontal frequency according to the present invention in which a further embodiment of method of measuring horizontal frequency according to the present invention is carried out.

Other structures of the embodiment shown in FIG. 5 are the same as those of the embodiment shown in FIG. 3 and operate in the same manner as those of the embodiment shown in FIG. 3, FIG. 6 shows a further embodiment of apparatus for measuring horizontal frequency according to the present invention in which a further embodiment of method of measuring horizontal frequency according to the present invention is carried out.

The embodiment shown in FIG. 6 is also constituted in almost the same manner as the embodiment shown in FIG. 3. In FIG. 6, the blocks and signals which corresponding to those in the embodiment shown in FIG. 3 are marked with the references used in common with the embodiment shown in FIG. 3 and a further explanation thereof will be omitted.

In the embodiment shown in FIG. 6, the vertical synchronous signal SV separated from the video signal is supplied both to the 8-bit counter 21 to which the horizontal synchronous signal SH is supplied and the 16-bit counter 22 to which the clock pulses CLK are supplied.

When the vertical synchronous signal SV is supplied to the 8-bit counter 21, the 8-bit counter 21 is subjected to reset by the vertical synchronous signal SV at the time point corresponding to, for example, the front edge of the vertical synchronous signal SV. The 8-bit counter 21 starts to count anew the horizontal synchronous pulses PH constituting the horizontal synchronous signal SH and produces count data of the horizontal synchronous pulses PH each time of reset by the vertical synchronous signal SV.

Further, when the vertical synchronous signal SV is supplied to the 16-bit counter 22, the 16-bit counter 22 is subjected to reset by the vertical synchronous signal SV at the time point corresponding to, for example, the front edge of the vertical synchronous signal SV. The 16-bit counter 22 starts to count anew the clock pulses CLK and produces count data DCU of the clock pulses CLK each time of reset by the vertical synchronous signal SV.

Figure 7:
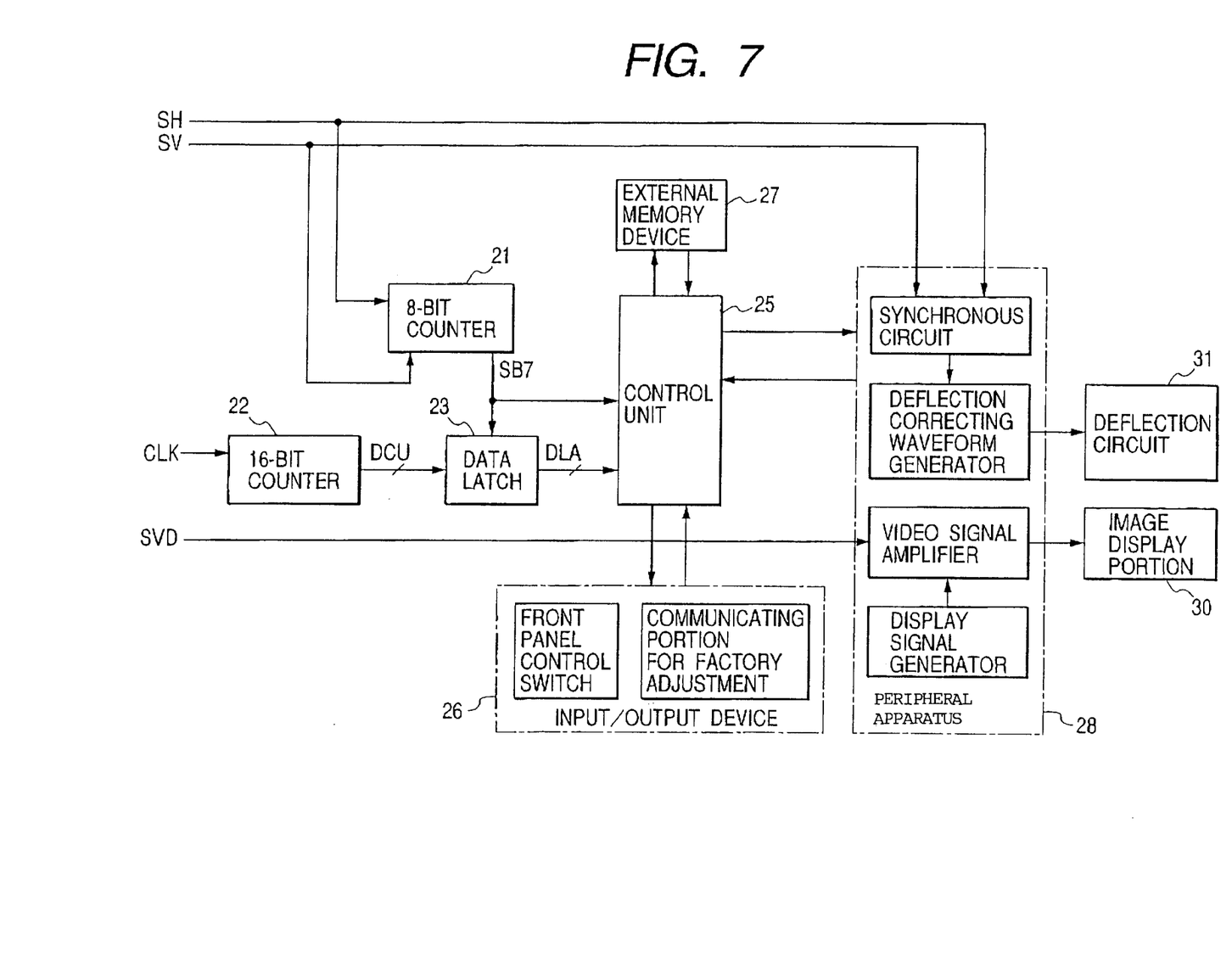
FIG. 7 is a schematic block diagram showing an example of an image display equipment to which the embodiment shown in FIG. 3 is applied.

Other structures of the embodiment shown in FIG. 6 are the same as those of the embodiment shown in FIG. 3 and operate in the same manner as those of the embodiment shown in FIG. 3, FIG. 7 shows an example of an image display equipment to which the embodiment shown in FIG. 3 is applied.

Referring to FIG. 7, the 8-bit counter 21 to which the horizontal synchronous signal SH and the vertical synchronous signal SV separated from the video signal are supplied, the 16-bit counter 22 to which the clock pulses CLK are supplied, the data latch 23 and the control unit 25 are provided to constitute the embodiment of apparatus for measuring horizontal frequency according to the present invention. The control unit 25 is supplied with the bit output signal SB7 obtained from the 8-bit counter 21 and the latch data DLA which is the count data DCU from the 16-bit counter 22 latched by the data latch 23 to which the bit output signal SB7 obtained from the 8-bit counter 21 is supplied.

The input/output device 26, the external memory device 27 and the peripheral apparatus 28 are connected with the control unit 25.

The input/output device 26 contains a front panel control switch provided on a front panel of the equipment to be handled by users, a communicating portion for factory adjustment which is used for adjusting the equipment in a manufacturing factory, and so on. The external memory device 27 is constituted with, for example, an electrically erasable programable read only memory (EEPROM).

Further, the peripheral apparatus 28 comprises a synchronous circuit to which the horizontal synchronous signal SH and the vertical synchronous signal SV are supplied, a deflection correcting waveform generator connected to the synchronous circuit, a video signal amplifier to which a video signal SVD used for image display is supplied, and a display signal generator operative to generate display signals for displaying operating conditions of the equipment in response to handling by the users and supply the video signal amplifier with the display signals. The horizontal synchronous signal SH and the vertical synchronous signal SV are separated from the video signal SVD.

The video signal SVD amplified by the video signal amplifier in the peripheral apparatus 28, the display signals from the display signal generator or both of the video signal SVD and the display signals from the display signal generator are supplied to an image display portion 30. The image display portion 30 comprises a cathode ray tube for image display. Collected deflection signals obtained from the deflection correcting waveform generator in the peripheral apparatus 28 are supplied to a deflection circuit 31. The deflection circuit 31 is operative to perform deflection control to the cathode ray tube for image display in the image display portion 30.

In the image display apparatus thus constituted, the images based on the video signal SVD, the display signals from the display signal generator or both of the video signal SVD and the display signals from the display signal generator are displayed in the image display portion 30. The embodiment of apparatus for measuring horizontal frequency according to the present invention, which comprises the 8-bit counter 21, the 16-bit counter 22, the data latch 23 and the control unit 25, is operative to measure the horizontal frequency of the video signal SVD.

The result of measurement of the horizontal frequency of the video signal SVD obtained in the control unit 25 is used for, for example, adjustments made by the users to obtain a size of display on the image display portion 30 appropriate to the signals supplied to the image display portion 30.

It is to be understood that an image display equipment to which the embodiment of apparatus for measuring horizontal frequency according to the present invention, which is shown in FIG. 5 or FIG. 6, is constituted in almost the same manner as the image display equipment shown in FIG. 7.

Although the horizontal synchronous pulses PH constituting the horizontal synchronous signal SH are counted by the 8-bit counter 21 and the clock pulses CLK are counted by the 16-bit counter 22 in each of the embodiments aforementioned, it is, of course, possible to employ the N-bit counter other than the 8-bit counter for counting the horizontal synchronous pulses PH constituting the horizontal synchronous signal SH and to employ the M-bit counter other than the 16-bit counter for counting the clock pulses CLK.

Besides, although the latch of the count data in the data latch 23 and the store of the latch data in the memory device contained in the control unit 25 are carried out in response to the bit output signal SB7 obtained from the seventh bit position of the 8-bit counter 21 in each of the embodiments aforementioned, it is possible to make arrangements for carrying out the latch of the count data in the data latch 23 and the store of the latch data in the memory device contained in the control unit 25 in response to a bit output signal obtained from a bit position other than the seventh bit position of the 8-bit counter 21 or a bit output signal obtained from a predetermined bit position of the N-bit counter.

What is claimed is:

1. A method of measuring horizontal frequency, which comprises the steps of;

resetting an N-bit counter (N is a positive integer), which is operative to count pulses constituting a horizontal synchronous signal separated from a video signal, at a time point corresponding to a front or rear edge of a vertical synchronous signal separated from the video signal, causing a data latch portion, which is operative to latch selectively count data obtained from an M-bit counter (M is a positive integer) operative to count clock pulses having a predetermined frequency, to latch the count data obtained from the M-bit counter at a time point corresponding to a front or rear edge of a bit output signal obtained from a predetermined bit position of the N-bit counter, detecting a period which corresponds to X times (X is a positive integer) a horizontal period of the video signal based on a difference between counted values represented respectively by a couple of count data latched successively by the data latch portion, and measuring horizontal frequency of the video signal by calculating the horizontal frequency on the strength of the period corresponding to X times the horizontal period of the video signal.

2. A method according to claim 1, wherein the horizontal frequency is calculated by obtaining an inverse of 1/X the value representing the detected period corresponding to X times the horizontal period.

3. A method according to claim 1, wherein the N-bit counter is an 8-bit counter, the data latch portion is caused to latch the count data obtained from the M-bit counter at a time point corresponding to a front edge of a bit output signal obtained from the seventh bit position of the 8-bit counter, and a period which corresponds to 128 times the horizontal period is detected.

4. A method according to claim 2, wherein the N-bit counter is an 8-bit counter, the data latch portion is caused to latch the count data obtained from the M-bit counter at a time point corresponding to a front or rear edge of a bit output signal obtained from the seventh bit position of the 8-bit counter, a period which corresponds to 128 times the horizontal period is detected, and the horizontal frequency is calculated by obtaining an inverse of 1/128 the value representing the detected period corresponding to 128 times the horizontal period.

5. An apparatus for measuring horizontal frequency, which comprises an N-bit counter (N is a positive integer) operative to count pulses constituting a horizontal synchronous signal separated from a video signal and subjected to resetting at a time point corresponding to a front or rear edge of a vertical synchronous signal separated from the video signal, an M-bit counter (M is a positive integer) operative to count clock pulses having a predetermined frequency, a data latch portion operative to latch selectively count data obtained from the M-bit counter at a time point corresponding to a front or rear edge of a bit output signal obtained from a predetermined bit position of the N-bit counter, and an operation control portion for detecting a period which corresponds to X times (X is a positive integer) a horizontal period of the video signal based on a difference between counted values represented respectively by a couple of count data latched successively by the data latch portion and measuring the horizontal frequency of the video signal by calculating the horizontal frequency on the strength of the period corresponding to X times the horizontal period of the video signal.

6. An apparatus according to claim 5, wherein said operation control portion is operative to calculate the horizontal frequency by obtaining an inverse of 1/X the value representing the detected period corresponding to X times the horizontal period.

7. An apparatus according to claim 5, wherein said N-bit counter is supplied with the vertical synchronous signal separated from the video signal and subjected to resetting at the time point corresponding to the front or rear edge of the vertical synchronous signal.

8. An apparatus according to claim 5, wherein said operation control portion is supplied with the vertical synchronous signal separated from the video signal and operative to reset said N-bit counter at the time point corresponding to the front or rear edge of the vertical synchronous signal.

9. An apparatus according to claim 5, wherein said data latch portion is supplied with the bit output signal obtained from the predetermined bit position of the N-bit counter and operative to latch the count data obtained from the M-bit counter at the time point corresponding to the front or rear edge of the bit output signal.

10. An apparatus according to claim 5, wherein said M-bit counter is supplied with the vertical synchronous signal separated from the video signal and subjected to resetting at the time point corresponding to the front or rear edge of the vertical synchronous signal.

11. An apparatus according to claim 5, wherein said operation control portion is provided with a memory device in which the count data obtained from said M-bit counter and latched by said data latch portion are stored.

12. An apparatus according to claim 5, wherein said N-bit counter is an 8-bit counter, said data latch portion is caused to latch the count data obtained from the M-bit counter at a time point corresponding to a front edge of a bit output signal obtained from the seventh bit position of the 8-bit counter, and a period which corresponds to 128 times the horizontal period is detected.

13. A method according to claim 6, wherein said N-bit counter is an 8-bit counter, said data latch portion is caused to latch the count data obtained from the M-bit counter at a time point corresponding to a front or rear edge of a bit output signal obtained from the seventh bit position of the 8-bit counter, a period which corresponds to 128 times the horizontal period is detected, and the horizontal frequency is calculated by obtaining an inverse of 1/128 the value representing the detected period corresponding to 128 times the horizontal period.

* * * * *